(No Model.)
D. SWAROVSKI.
APPARATUS FOR THE MANUFACTURE OF BEADS OF ENAMEL.
No. 423,579. Patented Mar. 18, 1890.
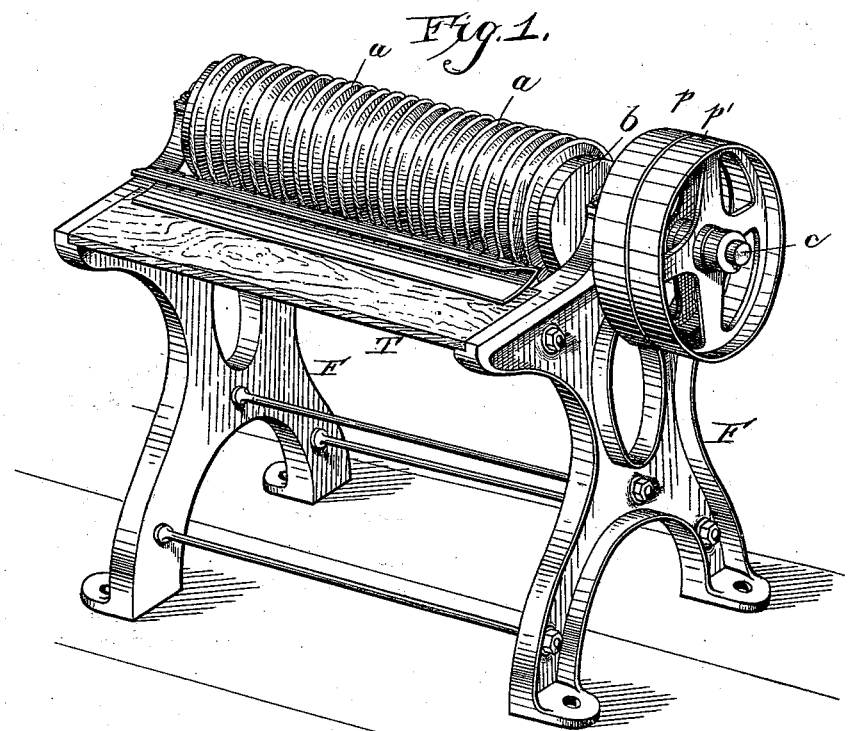
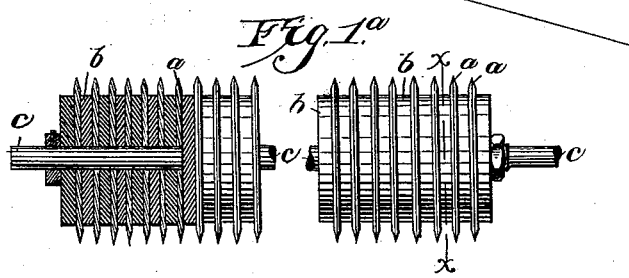
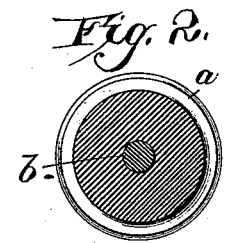
Witnesses:
Henry G. Dieterich
Thomson Cross
Inventor,
Daniel Swarovski
per Henry Orth
Attorney.

UNITED STATES PATENT OFFICE.

DANIEL SWAROVSKI, OF GABLONZ, BOHEMIA, AUSTRIA-HUNGARY, ASSIGNOR TO GUSTAV STRAUSS & CO., OF SAME PLACE.

APPARATUS FOR THE MANUFACTURE OF BEADS OF ENAMEL.

SPECIFICATION forming part of Letters Patent No. 423,579, dated March 18, 1890.

Application filed June 6, 1889. Serial No. 313,292. (No model.)

*To all whom it may concern:*

Be it known that I, DANIEL SWAROVSKI, a subject of the Emperor of Austria-Hungary, residing at Gablonz, in the Province of Bohemia, in the Empire of Austria-Hungary, have invented certain new and useful Improvements in Apparatus for the Manufacture of Beads of Enamel; and I do hereby declare the following to be a full, clear, and exact description of the invention, such as will enable others skilled in the art to which it appertains to make and use the same.

This invention relates to the art of manufacturing glass beads, and more especially that class of beads known as "bugles," and consisting of short cylinders of glass generally used for trimming ladies' garments. These beads have heretofore been obtained by what is termed "cracking" glass tubes into the desired size of bead, this being effected by presenting the tube to a revoluble cutter, usually made of sandstone, having a sharp cutting-edge, the sizing of the beads being done by sight only, requiring practice and judgment, while even with this it is impossible to produce beads of uniform length adapted for weaving into fabrics; hence the beads have heretofore been connected with fabrics by sewing them thereto by hand, or by first stringing and then sewing the beads by hand.

The object of my invention is to provide means whereby such beads may be obtained in uniform sizes, and whereby the labor of cutting or cracking the tubes is very materially reduced; and it consists in structural features and combinations of devices whereby the results indicated are attained substantially as hereinafter fully described, and set forth in the claims.

In carrying out my invention I construct a cutter in such a manner that the length of each bead will be determined by the cutter itself, and that will cut a number of beads simultaneously. I further provide means for holding the glass tube to the cutter.

Referring to the accompanying drawings, Figure 1 is an isometric view of a machine embodying my invention. Fig. 1ª shows in elevation, partly in longitudinal section, a cutter constructed according to my invention. Fig. 2 is a section on line $x\,x$ of Fig. 1. Fig. 3 is an elevation of the holder for the glass tube, and Fig. 4 is a section on line $y\,y$ of Fig. 3.

In the drawings, F indicates the main frame, provided with a shelf or table T for the holder $d$ for the glass tube. The frame F is further provided with suitable bearings for the cutter-shaft $c$, that carries the loose and fast driving-pulleys $p$ and $p'$, respectively.

The cutter is composed of any desired number of cutter-disks $a$, which are preferably made of thin sheet-steel rigidly secured to a revoluble shaft $c$, the length of the beads being determined by the distance between each two cutters. As stated, these cutters are preferably made of thin sheet-steel or steel plates, and consequently are more or less elastic. I provide means for bracing or stiffening the same, such means serving also to determine the spaces between the disks, and consist of spacing-disks $b$ of a thickness equal to the length of bead to be cut. The disks and cutters are keyed or otherwise detachably secured to the shaft $c$, so as to admit of their ready removal and substitution of spacing-disks of varying thickness, according to the length of bead to be cut.

In order to prevent the breaking of the glass tubes during the operation of cutting, and also to provide a holder for the same, I preferably introduce into said glass tubes a wire $w$, (see Fig. 4,) which may be cemented within the tube or not, and of such a thickness as to nearly fill the bore or hollow internal portion of the tube.

To prevent the cutters from penetrating into the tube more than is necessary, and to cut into the wire core, I provide a gage or guide $d$, of suitable form in cross-section and having notches $d'$, corresponding in location to that of the cutter-disks $a$ on shaft $c$, the shape of said notches determining the depth of cut of the cutters. The guide or gage may be secured in position on the table T in front of the revolving cutters by any desired means and in such manner as to be readily removed for the substitution of another, according to the length of the bead to be cut, or the thickness of the glass tube; or said gage may be held to the cutters by hand.

When the glass tube to be cut is not a polished one, the beads are subjected to the usual operation of polishing.

Having described my invention, what I claim, and desire to secure by Letters Patent, is—

1. As a means for cutting or cracking glass tubes into equal lengths in the manufacture of beads, which consist in the combination, with a plurality of equidistant revoluble cutters, of a support for the glass tube, having slots corresponding in position to that of the cutters, substantially as and for the purposes specified.

2. As a means for cutting or cracking glass tubes into equal lengths in the manufacture of beads and determining the length of cut, which consist in the combination, with a series of equidistant revoluble cutters, of a gage consisting of a guide V-shaped in cross-section for the reception of the glass tube, said guide being provided with slots or notches in the angular portion thereof, substantially as and for the purposes specified.

3. A machine for cutting or cracking glass tubes into equal lengths, comprising a gang of equidistant cutters, a revoluble shaft for said cutters, a suitable frame-work provided with bearings for said shaft, and a platform or table in front of the cutters, in combination with a holder for the glass tube adapted to be supported from the table and provided with slots corresponding in position to that of the cutters, substantially as and for the purpose specified.

4. A machine for cutting or cracking glass tubes into equal lengths, comprising a revoluble shaft, a gang of cutter-disks adjustably secured thereto, and spacing-disks varying in thickness and adapted to be interchangeably secured to said shaft between the cutter-disks for the purpose of varying the distance between them, in combination with holders for the glass tube provided with a number of slots equal to that of the cutter-disks, the distance between each two slots of said holders varying with the distance between the cutters, substantially as and for the purposes specified.

In testimony whereof I affix my signature in presence of two witnesses.

DANIEL SWAROVSKI.

Witnesses:
GUSTAV MOLDNER,
EDWARD HIRSCH.